United States Patent
Towle

(10) Patent No.: US 10,498,018 B2
(45) Date of Patent: Dec. 3, 2019

(54) IONIC FLUID ANTENNA

(71) Applicant: Jonathan P. Towle, Andover, MA (US)

(72) Inventor: Jonathan P. Towle, Andover, MA (US)

( * ) Notice: Subject to any disclaimer, the term of this patent is extended or adjusted under 35 U.S.C. 154(b) by 287 days.

(21) Appl. No.: 15/329,109

(22) PCT Filed: Jul. 28, 2015

(86) PCT No.: PCT/US2015/042487
§ 371 (c)(1),
(2) Date: Jan. 25, 2017

(87) PCT Pub. No.: WO2016/018919
PCT Pub. Date: Feb. 4, 2016

(65) Prior Publication Data
US 2017/0214131 A1    Jul. 27, 2017

Related U.S. Application Data

(60) Provisional application No. 62/030,910, filed on Jul. 30, 2014, provisional application No. 62/030,918, filed on Jul. 30, 2014.

(51) Int. Cl.
*H01Q 1/36* (2006.01)
*G01F 1/66* (2006.01)
(Continued)

(52) U.S. Cl.
CPC ............. *H01Q 1/366* (2013.01); *G01F 1/662* (2013.01); *G01F 7/00* (2013.01); *H01Q 3/22* (2013.01); *H04L 9/0852* (2013.01)

(58) Field of Classification Search
CPC .................................. H01Q 1/36; H01Q 3/22
(Continued)

(56) References Cited

U.S. PATENT DOCUMENTS 5,060,506 A * 10/1991 Douglas ............... G01N 29/024
73/19.03
5,990,837 A    11/1999 Norris et al.
(Continued)

FOREIGN PATENT DOCUMENTS

GB       1268942    *  4/1968    ............... H01Q 3/22
GB       1268942 A     3/1972
(Continued)

OTHER PUBLICATIONS

EP search report for EP15826779.9 dated Feb. 12, 2018.

*Primary Examiner* — Andrea Lindgren Baltzell
(74) *Attorney, Agent, or Firm* — O'Shea Getz P.C.

(57) ABSTRACT

Aspects of the disclosure are directed to an apparatus for providing an ionic fluid antenna. The apparatus may include a body configured to contain an ionic fluid, an acoustic transducer coupled to the body, and a power supply coupled to the acoustic transducer that is configured to drive the acoustic transducer in accordance with at least one frequency. Aspects of the disclosure are directed to an apparatus for providing an ionic fluid antenna used in secure communications, comprising: a body configured to contain an ionic fluid, an acoustic transducer coupled to the body, and a power supply coupled to the acoustic transducer that is con figured to drive the acoustic transducer based on an encryption of data using polarized photons for quantum key distribution.

21 Claims, 6 Drawing Sheets

(51) Int. Cl.
*G01F 7/00* (2006.01)
*H01Q 3/22* (2006.01)
*H04L 9/08* (2006.01)

(58) Field of Classification Search
USPC .......................................... 343/701
See application file for complete search history.

(56) References Cited

U.S. PATENT DOCUMENTS

| | | | |
|---|---|---|---|
| 6,087,992 A * | 7/2000 | Anderson | H01Q 1/366 250/282 |
| 6,118,407 A | 9/2000 | Anderson | |
| 6,169,520 B1 | 1/2001 | Anderson | |
| 6,211,617 B1 | 4/2001 | Deegan | |
| 6,369,763 B1 | 4/2002 | Norris et al. | |
| 6,492,951 B1 | 12/2002 | Harris et al. | |
| 6,503,204 B1 * | 1/2003 | Sumanaweera | B06B 1/0622 600/459 |
| 6,738,697 B2 * | 5/2004 | Breed | B60C 11/24 701/31.5 |
| 6,806,833 B2 | 10/2004 | Anderson | |
| 7,453,403 B2 | 11/2008 | Anderson | |
| 7,773,044 B2 | 8/2010 | Oksanen et al. | |
| 7,898,484 B1 | 3/2011 | Tam | |
| 7,969,370 B1 | 6/2011 | Dinh et al. | |
| 7,999,747 B1 | 8/2011 | Wedding et al. | |
| 8,085,621 B2 | 12/2011 | Massa | |
| 8,756,997 B2 * | 6/2014 | Questo | G01N 29/12 73/1.82 |
| 2004/0061650 A1 | 4/2004 | Anderson et al. | |
| 2005/0280372 A1 * | 12/2005 | Anderson | H01Q 1/366 315/111.21 |
| 2007/0132656 A1 | 6/2007 | Kim et al. | |
| 2008/0267635 A1 * | 10/2008 | Kawamoto | H04B 10/548 398/141 |

FOREIGN PATENT DOCUMENTS

JP          4838166 B2    12/2011
WO    WO2005022683 A2     3/2005

* cited by examiner

IONIC FLUID ANTENNA

CROSS-REFERENCE TO RELATED APPLICATION(S)

This application claims the benefit of PCT Patent Application No. PCT/US2015/042487 filed Jul. 28, 2015, which claims priority to U.S. Provisional Application No. 62/030,918, filed Jul. 30, 2014, and U.S. Provisional Application No. 62/030,910, filed Jul. 30, 2014. The contents of the foregoing applications are incorporated herein by reference.

BACKGROUND

Antennas are used in a variety of applications, such as in communications equipment. Antennas tend to be relatively large or bulky, consuming a significant portion of the footprint/space associated with such equipment. Additionally, the tuning range of such antennas tends to be limited, due in part to the components/devices that are used in constructing the antenna. Over that tuning range there exists gaps where no coverage is provided, representing a loss in terms of antenna performance/efficiency.

The communications may be vulnerable to being intercepted by third parties (e.g., by parties outside of one or more intended recipients of the communications). Additional measures are needed in order to ensure the privacy and security of communications.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to an apparatus for providing an ionic fluid antenna, comprising: a body configured to contain an ionic fluid, an acoustic transducer coupled to the body, and a power supply coupled to the acoustic transducer that is configured to drive the acoustic transducer in accordance with at least one frequency.

In further embodiments of the foregoing aspect, the aforesaid apparatus may include additional elements or characteristics alone or in combination, and is not therefore limited to any particular configuration. For example, the ionic fluid may comprise at least one of plasma and an ionic liquid; the body may be configured as a hollow cylinder; the body may comprise a non-conductive material, and the non-conductive material may comprise at least one of glass and plastic; the acoustic transducer is coupled to a first end of the body, and the apparatus may include a second acoustic transducer coupled to a second end of the body that is opposite to the first end of the body; the second acoustic transducer may be coupled to the power supply; the apparatus may include a second power supply coupled to the second acoustic transducer that is configured to drive the second acoustic transducer in accordance with a second at least one frequency; the at least one frequency may be different from the second at least one frequency; the apparatus may include an electrode coupled to the acoustic transducer and the body, and a power source configured to produce radio frequency that is coupled to the electrode; the electrode may be configured to inject the radio frequency signal as a voltage varying with frequency into the ionic fluid when the ionic fluid antenna is operated in a transmit mode; the electrode may be configured to extract a voltage varying with frequency when the ionic fluid antenna is operated in a receive mode; the acoustic transducer may be included in a plurality of transducers arranged as part of a hexagonal geometry; adjacent pairs of the plurality of transducers may be configured to be driven in accordance with the at least one frequency; the apparatus may include a resonator coupled to the transducer, a resonator neck coupled to the resonator, and a conical coupler coupled to the neck, and the apparatus may include a tube, and an electrode coupled to the tube; the tube may have a length of approximately three-quarters of a wavelength associated with the operation of the apparatus, and the electrode may be separated from the transducer by approximately five-quarters of the wavelength; and the resonator may have a length that is approximately one-quarter of a wavelength associated with the operation of the apparatus.

Aspects of the disclosure are directed to an apparatus for providing an ionic fluid antenna used in secure communications, comprising: a body configured to contain an ionic fluid, an acoustic transducer coupled to the body, and a power supply coupled to the acoustic transducer that is configured to drive the acoustic transducer based on an encryption of data using polarized photons for quantum key distribution.

The foregoing aspects, features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
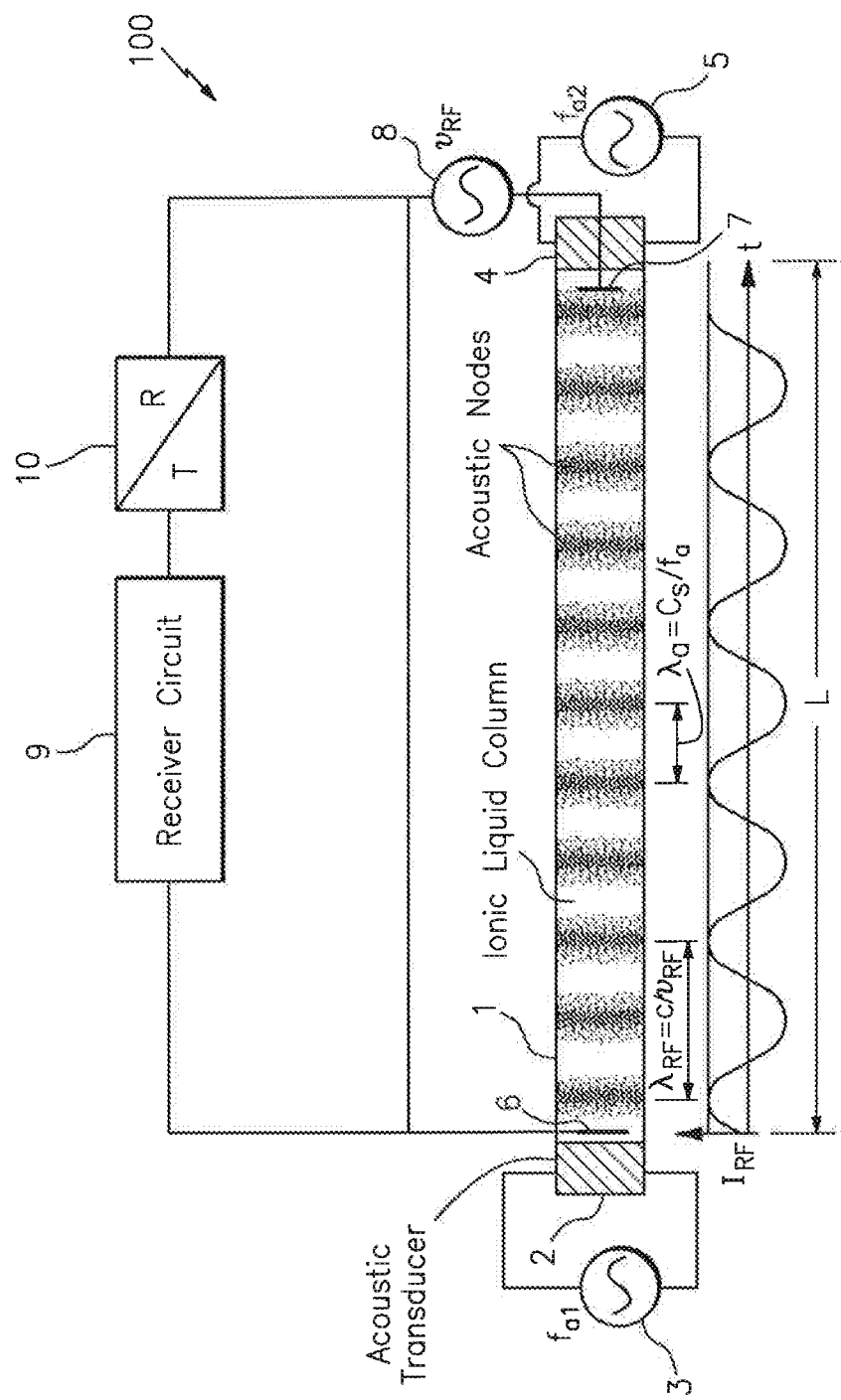
FIG. 1 illustrates a structure of an exemplary ionic fluid antenna (IFA).

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may potentially incorporate one or more intervening entities.

In accordance with various aspects of the disclosure, apparatuses, systems and methods are described for an antenna, such as an ionic fluid antenna (IFA). For example, aspects of the disclosure are directed to an antenna that utilizes an ionic fluid with unique electrical properties as the radiating medium. Acoustophoresis may be leveraged to tailor the radio frequency (RF) conductivity of the ionic fluid. As used herein, acoustophoresis may refer to a change in density of a fluid subjected to sound waves. More generally, acoustophoresis may refer to a separation of particles using sound waves.

Referring now to FIG. 1, an IFA apparatus or structure 100 in accordance with one or more embodiments is shown. The structure 100 includes a body 1 configured to contain an ionic fluid. The ionic fluid may include a plasma or one or more ionic liquids. An ionic liquid may be used 1f it has a conductivity greater than, e.g., 6 kiloSiemens per meter (kS/m). Simple solutions of salts, such as sodium chloride or copper sulphate can be used, either as aqueous solutions, or dissolved in another common solvent, such as ethylene glycol. Any salt with a low melting point (e.g. sodium aluminum tetrachloride, m.p. 185° C.), would provide an efficient radiating element.

The body 1 may be a hollow cylinder made out of one or more materials. Such materials may include glass, plastic, or any similar non-conductive material. The length of the body 1 can vary based on the application in which the structure 100 is used. For example, in a Wi-Fi application operating at a frequency of 2.4 GHz, the body 1 may include a cylinder of 31 mm in length (L) and 14 mm in diameter. The maximum diameter that is used or supported may be dependent on an applicable power limit. In an L-band Wi-Fi application operating at a frequency of 5.8 GHz, the body 1 may include a cylinder of 13 mm in length and 9 mm in diameter. The smaller size of the body 1 in the L-band Wi-Fi application is due to the shorter wavelengths of the transmitted radio waves of the L-band.

The body 1 need not be linear or rigid. However, maximizing the geometric symmetry of the body 1 may provide for the smallest possible gaps in terms of frequency band.

A first transducer 2 is located at one end of the body 1 and connects to an AC power supply 3. A second transducer 4 is located at the second, opposite, or other end of the body 1. The first transducer 2 and/or the second transducer 4 may be an acoustic transducer. In the embodiment of FIG. 1, the second transducer 4 may be present and used to reduce the amount of power that is needed to drive the first transducer 2.

In some embodiments, the second transducer 4 may be identical or substantially similar to the first transducer 2. The second transducer 4 may share the power supply 3 with the first transducer 2.

In some embodiments, the second transducer 4 may be driven by a separate AC power supply 5 that is different from the AC power supply 3 used to drive the first transducer 2. Separate power supplies 3, 5 may be used in embodiments where continuous wave tuning is provided. Continuous wave tuning may entail tuning with no loss of bandwidth due to gaps in frequencies. An acoustic frequency may be created parametrically, based on either a sum or difference of frequencies as described further below.

The structure 100 of FIG. 1 includes RF electrodes 6 and 7 located at opposite ends of the body 1. The electrodes 6 and 7 may be used to couple the transducers 2 and 4 to the body 1. A power source 8 that produces RF waves is coupled to the electrodes 6 and 7 via, e.g., coaxial cables.

As shown in FIG. 1, an RF wavelength ($\lambda_{RF}$) may be established that adheres to the formula:

$$\lambda_{RF} = c/v_{RF}.$$

where c corresponds to the speed of light in the ionic fluid and $v_{RF}$ corresponds to the frequency of the RF signal output by the power source 8.

Also, as shown in FIG. 1, an acoustic distance or wavelength ($\lambda_a$) may be established for acoustic nodes present in the body 1. The wavelength $\lambda_a$ adheres to the formula:

$$\lambda_a = C_S/f_a,$$

where $C_S$ corresponds to the speed of sound in the ionic fluid and $f_a$ corresponds to a frequency at which a transducer is driven. To the extent that more than one driving frequency is used (such as in embodiments where more than one transducer is used), the above formula may be modified accordingly.

The receiver circuit 9 and the T/R switch 10 may be used as part of a transmission or receive chain for communication purposes. The circuit 9 and switch 10 may be commercial off the shelf (COTS) products.

Figure 2:
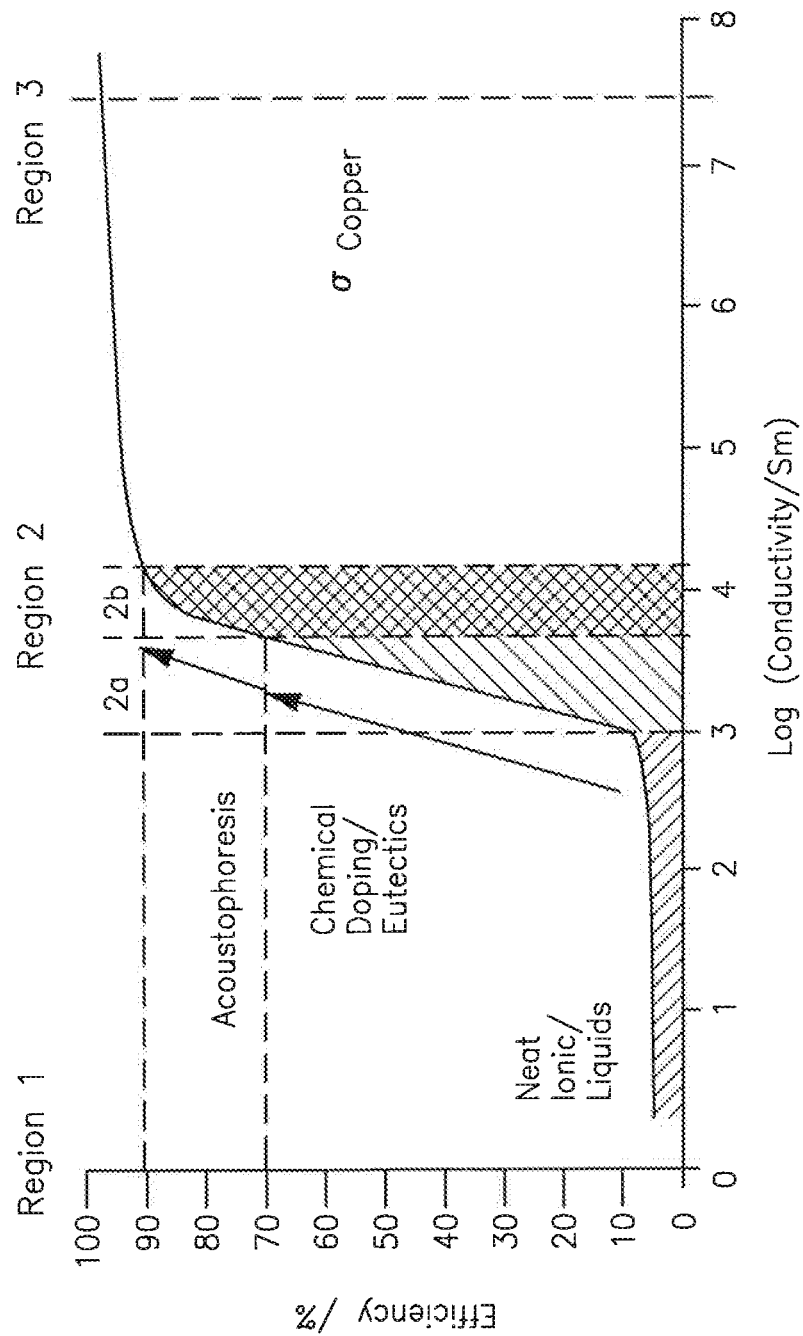
FIG. 2 illustrates an exemplary plot of efficiency of an antenna versus conductivity of a radiating medium used.

Referring now to FIG. 2, a plot 200 of efficiency of a resonant dipole antenna (along the vertical axis) as a function of the conductivity of the radiating medium used (along the horizontal axis) is shown. The efficiency of the resonant dipole antenna may vary in the same manner as an IFA. Accordingly, the concepts described below in connection with the plot 200 may be applied to an IFA or IFA structure, such as the structure 100 of FIG. 1. As shown in the plot 200, a small increase in conductivity (along the horizontal axis) may be reflected in a large increase in radiation efficiency of the antenna (along the vertical axis).

The plot 200 is subdivided into three distinct regions, denoted as Region 1, Region 2, and Region 3. Region 2 is further subdivided into sub-region 2a and sub-region 2b. The ranges or demarcation points described below for the regions and sub-regions is illustrative; one skilled in the art would appreciate that the regions or sub-regions may be separated from one another at various other points or values of demarcation.

In Region 1, the conductivity of the radiating medium is less than 3 kS/m. Region 1 represents a range of conductivity in which there are generally an insufficient number, amount, or concentration of mobile charge carriers available to support efficient radiation for the antenna element.

In Region 2, which ranges from approximately 3 kS/m to 4.1 kS/m, the number of mobile charge carriers increases proportionately with the conductivity, resulting in a rapid increase in radiation efficiency.

In sub-region 2a, the conductivity of the ionic fluid can be further increased by chemical doping. An example of chemical doping is provided by L. Zhou, "Porous Li4Ti5O1.2 Coated with N-Doped Carbon from Ionic Liquids for Li-Ion Batteries", Advanced Materials, Volume 23, Issue 11, Pages 1385-1388, March 2011, which describes chemical doping by adding carbon to bi-metallic particles to enhance the conductivity of a lithium ion battery. These same particles can be used in liquid suspension for the IFA.

In sub-region 2b, the RF conductivity can be increased over and above the increase achieved with chemical doping, by changing the density of the fluid using sound waves or acoustophoresis.

Region 3 represents antenna element conductivities above, e.g., 11 kS/m. In this region, there are an excess of mobile charge carriers, hence the efficiency of the antenna still increases, but much less rapidly than it does in Region 2.

There are any number of ways an WA could be configured, dependent on the requirements of an application. Such requirements may include size, weight, and cost. In some embodiments, an WA is configured to use a single transducer, driven at a frequency of $f_a$, to create a standing wave. The density of the charge carriers becomes more concentrated at the nodes of the standing wave, increasing conductivity of the ionic fluid. In a configuration employing two acoustic transducers, the first transducer (e.g., transducer 2 of FIG. 1) is driven at an acoustic frequency of $f_{a1}$, while the second acoustic transducer (e.g., transducer 4 of FIG. 1) is driven at an acoustic frequency of $f_{a2}$. The acoustic frequencies $f_{a1}$ and $f_{a2}$ combine to produce a standing wave of both the sum frequency:

$$\frac{(fa1 + fa2)}{2}$$

and the difference frequency:

$$\frac{(fa1 - fa2)}{2},$$

The acoustic transducers (e.g., transducers 2 and 4 of FIG. 1) and their associated driver circuits (e.g., power supplies 3 and 5 of FIG. 1) can be commercially available, off-the-shelf (COTS). Using two transducers, the values of $f_{a1}$ and $f_{a2}$ may be predetermined. This increases the range of available frequencies many times over and above that produced by a single transducer.

The range of frequencies may be increased still further by using additional acoustic transducers in more complicated geometric configurations. For example, FIG. 3 illustrates a portion of an WA apparatus or structure 300 arranged as a regular hexagonal geometry that utilizes a set of four transducers 302a, 302b, 302c, and 302d.

Figure 3:
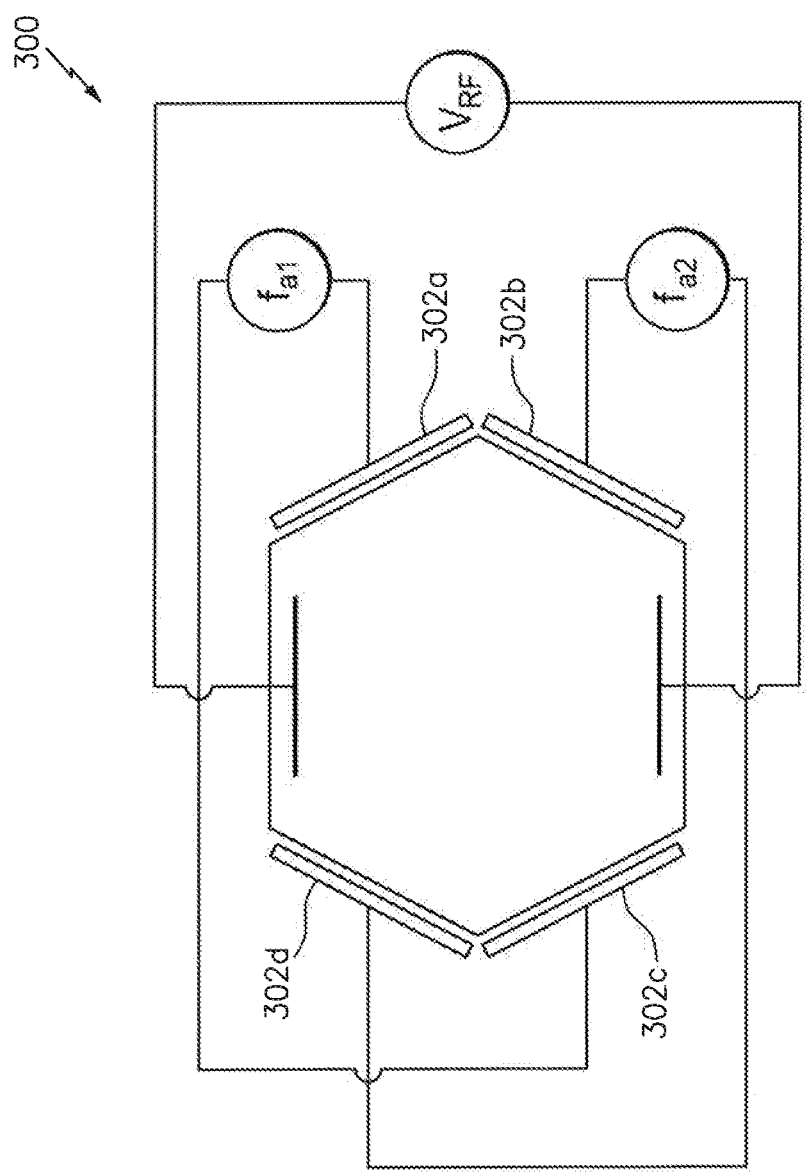
FIG. 3 illustrates a portion of an exemplary IFA structure incorporating a regular hexagonal geometry that utilizes four transducers.

Assuming that adjacent pairs of acoustic transducers (e.g., transducers 302a and 302b) in FIG. 3 were to be driven at a frequency of $f_a$, then the acoustic resonances from those adjacent pairs of acoustic transducers may be equal to:

$$f_a \sin(\pi/3).$$

Conversely, as shown in FIG. 3, if the adjacent pairs of acoustic transducers (e.g., transducers 302a and 302b) are driven at two different frequencies (e.g., $f_{a1}$ and $f_{a2}$), then the number of resulting acoustic frequencies may include both the sum frequencies:

$$\frac{(fa1 + fa2)\sin(\pi/3)}{2}$$

and the difference frequencies:

$$\frac{(fa1 - fa2)\sin(\pi/3)}{2}.$$

An IFA may be operated to create a radio frequency where a half-wavelength corresponds to the periodicity of the acoustic nodes. In a transmit mode of operation, the RF electrodes (e.g., electrodes 6 and 7 of FIG. 1) inject the RF signal as a voltage varying with frequency $v_{RF}$ into the ionic fluid. Similarly, in a receive mode of operation, a voltage varying with frequency $v_{RF}$ is extracted by the electrodes. Since the RF conductivity of the ionic fluid has been increased by acoustophoresis, the radiating efficiency of the fluid has correspondingly increased. In other words, a resonance condition is created between the RF signal and the acoustic wave. In the resonance condition:

$$v_{RF} = cf_a/2c_s,$$

where $v_{RF}$ is the frequency of the RF signal, $f_a$ is the superposition of $f_{a1}$ and $f_{a2}$ (as defined above), c is the speed of light in the ionic fluid, and $c_s$ is the speed of sound in the ionic fluid. The frequency of the superimposed standing acoustic wave $f_a$ may have a range of 5 kHz<$f_a$<1 MHz, and the resulting RF ($v_{RF}$) resonant frequencies may range from 665 MHz<$v_{RF}$<130 GHz, which is a frequency range of about 200×. By comparison, a conventional broad band antenna, e.g., a log-periodic antenna, may at best have a frequency range of about 15×.

To illustratively demonstrate an increase in frequency range made possible by an IFA in accordance with the disclosure, an example of an IFA set up in a tube of length L (such as the structure 100 of FIG. 1) may be considered. The spacing of the acoustic resonances in this example is given as $\Delta f_a c_s/2$ L. The resonance conditions, which account for the high efficiency IFA, occur at spacings of $\Delta v_{RF} = c/4$ L.

Figure 4:
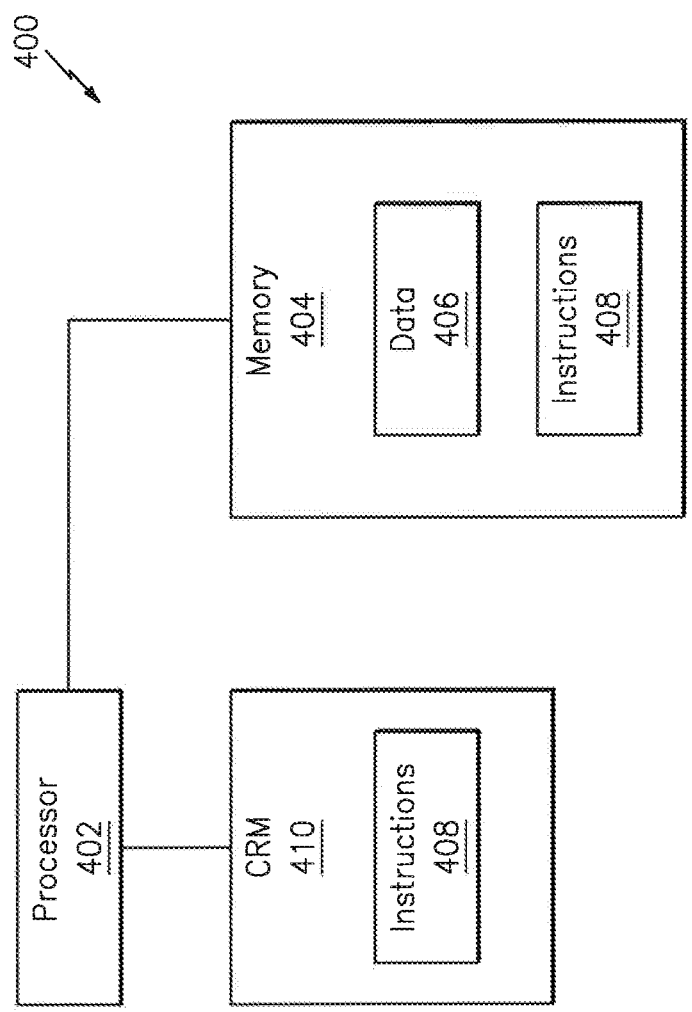
FIG. 4 illustrates an exemplary system for controlling and operating an WA.

In some embodiments, one or more control mechanisms may be connected to, or coupled to, an IFA structure (e.g., structure 100 or structure 300). For example, FIG. 4 illustrates a computing system 400 that may serve as a control mechanism. The system 400 includes one or more processors (generally shown by a processor 402) and a memory 404. The memory 404 may store data 406 and/or instructions 408. The system 400 may include a computer-readable medium (CRM) 410 that may store some or all of the instructions 408. The CRM 410 may include a transitory and/or non-transitory computer-readable medium.

The data 406 may include one or more parameters that may be associated with the operation of an IFA. For example, the parameters may include one or more of radiation patterns, directivity parameters, frequency parameters, frequency band parameters, gain parameters, polarization parameters, (effective) aperture parameters, etc. The data 406 may include signals or values associated with communication conducted using the IFA.

The instructions 408, when executed by the processor 402, may cause the system 400 to perform one or more methodological acts or processes, such as those described herein. As an example, execution of the instructions 408 may cause the system 400 to control the operation of an IFA.

Figure 5:
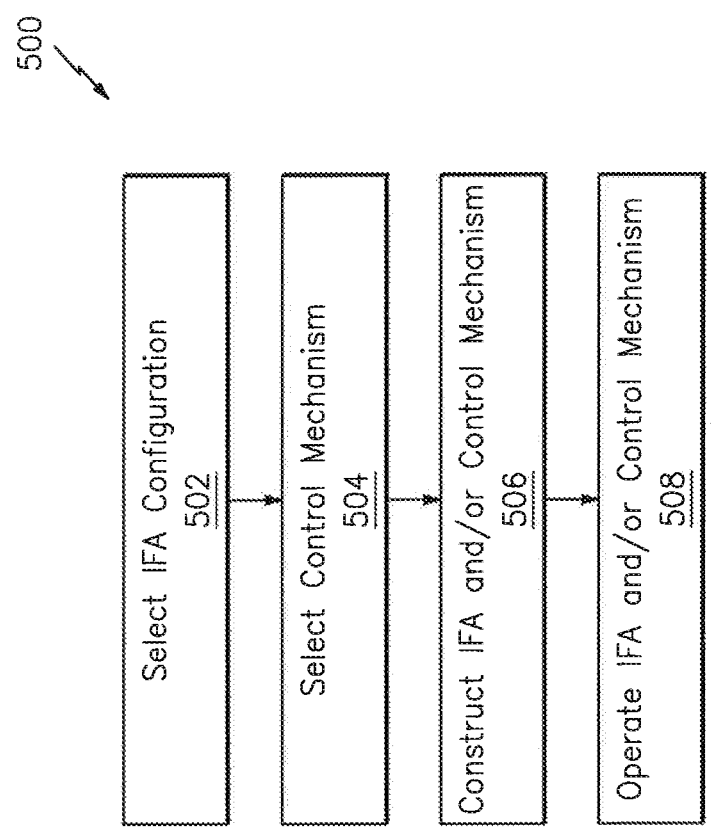
FIG. 5 illustrates a flow chart of an exemplary method for constructing and operating an IFA.

Referring now to FIG. 5, a method 500 in accordance with one or more aspects of the disclosure is shown. The method 500 may be used to control the operation of an antenna, such as an IFA. The method 500 may be executed in conjunction with one or more systems, components, or devices. For example, the method 500 may be executed in conjunction with the system 400, or a portion thereof.

In block 502, a configuration for an IFA may be selected. The configuration may be selected based on the requirements of an application that is to be supported. As described above, the requirements may include a specification of size, weight, and cost. Other requirements may be taken into consideration as part of the selection of block 502.

In block 504, a control mechanism may be selected for controlling the operation of the IFA selected in block 502.

For example, one or more aspects of the system 400 may be selected or configured as part of block 504, such as a specification of one or more parameters for operating the IFA.

In block 506, the WA of block 502 and/or the control mechanism of block 504 may be constructed in accordance with the techniques described herein or using other techniques known to skilled artisans.

In block 508, the constructed IFA and/or control mechanism of block 506 may be operated. The operation of block 508 may include the transmission or reception of one or more signals. The signals may be used to provide for communication between two or more parties or entities.

The method 500 is illustrative. In some embodiments, one or more blocks or operations of the method 500, or one or more portions thereof, may be optional. The blocks or operations may executed in an order or sequence that is different from what is shown in FIG. 5. In some embodiments, one or more additional blocks or operations not shown may be included.

In some embodiments, the amplitude of a pressure wave in the fluid of an IFA can be increased by feeding an acoustic wave into the IFA tube via a resonant cavity. A resonant angular frequency $\omega_H$ may be expressed (potentially in terms of radians/second) as:

$$\omega_H = (A^2 P_0 \gamma / m V_0)^{1/2},$$

where $\gamma$ is the adiabatic index or ratio of specific heats, A is the cross-sectional area of the neck, m is the mass in the neck, $P_0$ is the static pressure in the cavity, and $V_0$ is the static volume of the cavity.

For cylindrical or rectangular necks:

$$A = V_n / L_{eq},$$

where $V_n$ is the volume of the neck and $L_{eq}$ is the equivalent length of the neck with end correction and may be expressed as:

$$L_{eq} = L_n + 0.6 D_H,$$

where Ln is the physical length of the neck and DH is the hydraulic diameter of the neck. With the foregoing having been established, the resonant angular frequency OA may be expressed as:

$$\omega_H = (A V_n P_0 \gamma / L_{eq} m V_0)^{1/2}$$

Figure 6:
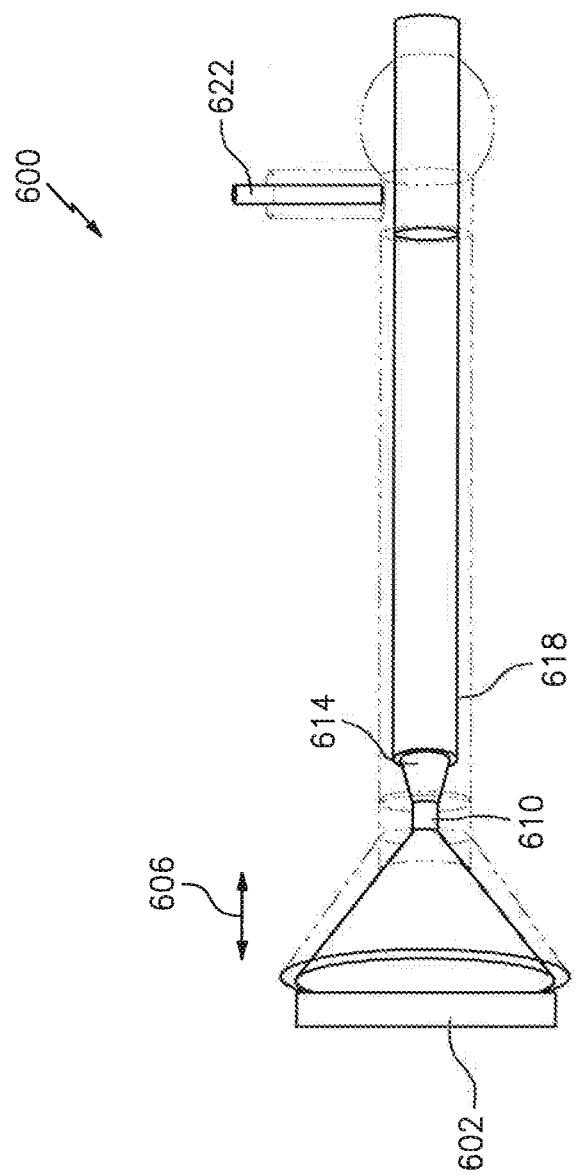
FIG. 6 illustrates a resonator feed structure for an IFA.

Referring now to FIG. 6, a resonator feed 600 for an IFA in accordance with aspects of the disclosure is shown. The structure 600 may include a transducer 602, such as for example a piezoelectric transducer coupled to a resonator (e.g., a quarter wavelength acoustic resonator as indicated by the arrow 606). The structure 600 includes a resonator neck 610 (e.g., a wavelength resonator neck) and a conical coupler 614 (e.g., a wavelength conical coupler). From the coupler 614 the structure 600 transitions to a tube 618. The tube 618 may be three-quarters of a wavelength in terms of length or dimension, at which point the structure 600 may transition to an electrode 622. The electrode may be five-quarters (5/4) of a wavelength in terms of length or dimension from the transducer 602.

The dimensions or lengths described above may be expressed in terms of an operating wavelength associated with the MA.

The IFAs described herein, and methods associated therewith, may provide for a number of features, including:

1) Tunability over ultra wide frequency bands, e.g., 500 MHz-130 GHz, which is a frequency range of approximately 200×. By comparison, the frequency range of a conventional log-periodic antenna is 500 MHz-7.5 GHz, or 15×.

2) Near-continuous tenability ($\Delta v$=100 MHz for a liquid antenna of length 50 cm), versus the large gaps (up to 10% of band of operation) of conventional log-periodic antennas, making the liquid antenna an ultra-efficient radiator.

3) Compact size (one-tenth the volume) relative to conventional antennas (such as a log-periodic antennas) that cover the same frequency band.

Any number of commercial applications may utilize or leverage the speed of the IFAs of this disclosure. As an example, sellers of stocks or equities may realize higher profit margins in connection with trading (e.g., high speed trading), potentially due to the (high) volume of trades involved. The IFAs of this disclosure represent a radical leap forward in antenna technology, with far-reaching implications for various networks, such as the Internet.

In accordance with aspects of the disclosure, an IFA may be used to provide secure communications. For example, the IFAs of this disclosure are suited for encryption using polarized photons for quantum key distribution, a highly secure and well-established technique. An extension to the use of quantum keys for standard encryption (e.g., 64 bit or 128 bit encryption) would be to establish a unique frequency scheduling table for two IFAS. The combination of a unique frequency scheduling table, or one-time pad, plus the IFA's unique ability to switch between frequencies, make it possible to send high speed messages at an unprecedented, unbreakable level of encryption—in fact, the absolute highest level of encryption possible. The frequency scheduling table may include a series of random frequencies that a pair of IFAs will exchange then switch between at predetermined time intervals.

Accordingly, the IFAs of this disclosure may be utilized in military applications, which demand the highest level of security possible. Absolute data security may be leveraged in hospital computer networks and other environments or applications where confidentiality of data is a concern. Any application on which the well-being of large numbers of people depends—communication networks, computer networks of power grids, etc. would be completely protected from the grave threat of cyber-terrorism.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure.

What is claimed is:

1. An apparatus for providing an ionic fluid antenna, comprising:
    a body configured to contain an ionic fluid;
    a first acoustic transducer coupled to a first end of the body; and
    a power supply coupled to the first acoustic transducer that is configured to drive the first acoustic transducer in accordance with at least one frequency; and
    a second acoustic transducer coupled to a second end of the body that is opposite the first end of the body.

2. The apparatus of claim 1, wherein the ionic fluid comprises at least one of plasma and an ionic liquid.

3. The apparatus of claim 1, wherein the body is configured as a hollow cylinder.

4. The apparatus of claim 1, wherein the body comprises a non-conductive material.

5. The apparatus of claim 4, wherein the non-conductive material comprises at least one of glass and plastic.

6. The apparatus of claim 1, wherein the first acoustic transducer and the second acoustic transducer are configured to produce a standing wave during operation of the ionic fluid antenna.

7. The apparatus of claim 6, wherein the second acoustic transducer is coupled to the power supply.

8. The apparatus of claim 6, further comprising:
a second power supply coupled to the second acoustic transducer that is configured to drive the second acoustic transducer in accordance with a second at least one frequency.

9. The apparatus of claim 8, wherein the at least one frequency is different from the second at least one frequency.

10. The apparatus of claim 1, further comprising:
an electrode coupled to the acoustic transducer and the body; and
a power source configured to produce radio frequency that is coupled to the electrode.

11. An apparatus for providing an ionic fluid antenna, comprising:
a body configured to contain an ionic fluid;
an acoustic transducer coupled to the body; and
a power supply coupled to the acoustic transducer that is configured to drive the acoustic transducer in accordance with at least one frequency;
an electrode coupled to the acoustic transducer and the body; and
a power source configured to produce radio frequency that is coupled to the electrode;
wherein the electrode is configured to inject the radio frequency signal as a voltage varying with frequency into the ionic fluid when the ionic fluid antenna is operated in a transmit mode.

12. An apparatus for providing an ionic fluid antenna, comprising:
a body configured to contain an ionic fluid;
an acoustic transducer coupled to the body; and
a power supply coupled to the acoustic transducer that is configured to drive the acoustic transducer in accordance with at least one frequency;
an electrode coupled to the acoustic transducer and the body; and
a power source configured to produce radio frequency that is coupled to the electrode;
wherein the electrode is configured to extract a voltage varying with frequency when the ionic fluid antenna is operated in a receive mode.

13. The apparatus of claim 1, wherein the first acoustic transducer and the second acoustic transducer are is included in a plurality of transducers arranged as part of a hexagonal geometry.

14. The apparatus of claim 13, wherein adjacent pairs of the plurality of transducers are configured to be driven in accordance with the at least one frequency.

15. The apparatus of claim 1, further comprising:
a resonator coupled to the transducer;
a resonator neck coupled to the resonator; and
a conical coupler coupled to the neck.

16. The apparatus of claim 15, further comprising:
a tube; and
an electrode coupled to the tube.

17. The apparatus of claim 16, wherein the tube is of a length of approximately three-quarters of a wavelength associated with the operation of the apparatus, and wherein the electrode is separated from the transducer by approximately five-quarters of the wavelength.

18. The apparatus of claim 15, wherein the resonator has a length that is approximately one-quarter of a wavelength associated with the operation of the apparatus.

19. An apparatus for providing an ionic fluid antenna used in secure communications, comprising:
a body configured to contain an ionic fluid;
an acoustic transducer coupled to the body; and
a power supply coupled to the acoustic transducer that is configured to drive the acoustic transducer based on an encryption of data using polarized photons for quantum key distribution.

20. The apparatus of claim 19, wherein the encryption is extended based on the use of a frequency scheduling table for the ionic fluid antenna and a second ionic fluid antenna.

21. The apparatus of claim 20, wherein the frequency scheduling table comprises a series of random frequencies, and wherein the apparatus is configured to exchange the frequency scheduling table with a second ionic fluid antenna and switch between the frequency scheduling table and a second frequency scheduling table at predetermined time intervals.

* * * * *